United States Patent
Sato

(10) Patent No.: US 6,652,787 B2
(45) Date of Patent: Nov. 25, 2003

(54) PROCESS FOR THE PRODUCTION OF A WIPING MATERIAL FOR A VACUUM CHAMBER

(75) Inventor: Yukio Sato, Kanagawa (JP)

(73) Assignees: Inoac Corporation, Aichi (JP); Inoac Technical Center, Aichi (JP)

(*) Notice: Subject to any disclaimer, the term of this patent is extended or adjusted under 35 U.S.C. 154(b) by 331 days.

(21) Appl. No.: 09/891,173

(22) Filed: Jun. 26, 2001

(65) Prior Publication Data

US 2002/0016377 A1 Feb. 7, 2002

(30) Foreign Application Priority Data

Jun. 30, 2000 (JP) .................................... P.2000-199972

(51) Int. Cl.$^7$ .............................................. B29C 44/02
(52) U.S. Cl. .......................................... 264/51; 264/54
(58) Field of Search ....................................... 264/51, 54

(56) References Cited

U.S. PATENT DOCUMENTS

| | | | | |
|---|---|---|---|---|
| 5,578,362 A | * | 11/1996 | Reinhardt et al. | 428/147 |
| 6,239,188 B1 | * | 5/2001 | Kihara et al. | 521/159 |
| 6,290,883 B1 | * | 9/2001 | Crevasse et al. | 264/50 |
| 6,346,202 B1 | * | 2/2002 | Molnar | 216/88 |

* cited by examiner

Primary Examiner—Allan R. Kuhns
(74) Attorney, Agent, or Firm—Sughrue Mion, PLLC

(57) ABSTRACT

The present invention provides a wiping material for a vacuum chamber having sufficient sludge wiping properties and water retention attained by easy control over cell diameter and use of a polyurethane foam which has been foamed free from a silicone-based surface active agent and a process for the production thereof. A wiping material made of a polyurethane foam for a vacuum chamber for use in the preparation of a silicon wafer is described, wherein the polyurethane foam is free of silicone and has an open-cell structure comprising cells the diameter of which are controlled to fall within the range of from 500 μm to 3,000 μm.

3 Claims, 4 Drawing Sheets

PROCESS FOR THE PRODUCTION OF A WIPING MATERIAL FOR A VACUUM CHAMBER

FIELD OF THE INVENTION

The present invention relates to a wiping material for a vacuum chamber for use in the preparation of a silicon wafer and a process for the production thereof. More particularly, the present invention relates to a wiping material for a vacuum chamber made of a polyurethane foam which can exhibit sufficient moisture retention and wiping properties and a process which can fairly prepare such a wiping material.

BACKGROUND OF THE INVENTION

A silicon wafer indispensable for the production of computer chips or the like is produced by subjecting a desired substrate to vacuum metallization with a metal such as tungsten, aluminum and copper. In this process, a vacuum chamber is used. It is known that a metal which has been ionized during the vacuum metallization step is deposited as a sludge on the inner wall of the vacuum chamber to grow in laminar form with time. The sludge thus deposited on the inner wall of the vacuum chamber causes unevenness in the vacuum metallization on the substrate and the drop of efficiency in vacuum metallization as well as gives adverse effects such as contamination by impurities. Thus, the sludge must be fully removed depending on the circumstances of vacuum metallization.

The foregoing full removal operation involves (1) a step of scraping the surface of the foregoing solidified sludge with an abrasive pad or the like, (2) a step of wiping out a sludge left unremoved with a wiping material impregnated with a detergent, and (3) a final step of wiping the inner wall of the vacuum chamber with the foregoing wiping material until there is no effect on the vacuum metallization on the substrate to finish the inner wall of the vacuum chamber. As the wiping material to be used at the steps (2) and (3) there is used a material free of silicone, which has adverse effects on the vacuum metallization on the substrate, and containing little lint, such as nonwoven cellulose cloth.

However, when the foregoing nonwoven cloth is used to conduct removal of sludge, a large amount of nonwoven cloth is required because the foregoing deposit is a sludge and wiping is conducted with a detergent. By way of example, about 30 sheets of nonwoven cloth are used per one operation. This operation is conducted about 15 times. Accordingly, the nonwoven cloth is used in an amount as large as about 450 sheets per vacuum chamber. As the foregoing nonwoven cellulose cloth there may be used a relatively inexpensive product made of regenerated material. However, since severe requirements must be met to wipe out the sludge, the amount of nonwoven cloth to be used must be increased anyway. Further, since the nonwoven cloth can be hardly re-used, it is essentially disadvantageous in that the running cost increases in all.

A nonwoven cloth is essentially a cloth and thus can be easily clogged. Thus, a nonwoven cloth has not so good capability of scraping and wiping a sludge. Further, since a nonwoven cloth is an aggregate of fibers, it is said disadvantageous in that it inevitably produces lint, though in a small amount. Moreover, since an individual nonwoven cloth is not thick enough, it is said disadvantageous in that it can hardly be handled manually during cleaning operation.

Thus, it can be proposed that various spongy foams be used as wiping material instead of the foregoing nonwoven cloth. These foams are easily available in a thickness suitable for gripping by the operator and thus have a good handleability. Further, these foams can be easily freed of sludge and detergent when washed after operation. These foams are also advantageous in that they produce no lint. However, these foams are obtained by foaming with a silicone-based surface active agent as a foam stabilizer. Accordingly, these foams are greatly disadvantageous in that when used to wipe the interior of the vacuum chamber, silicone remains on the inner wall of the vacuum chamber, giving impurities which contaminate the resulting silicon wafer and other products.

SUMMARY OF THE INVENTION

The present invention has been worked out to give good solution to the foregoing problems with the use of prior art wiping materials for a vacuum chamber.

It is therefore an object of the present invention to provide a wiping material for a vacuum chamber having sufficient sludge wiping properties and water retention attained by easy control over cell diameter and use of a polyurethane foam which has been foamed free from a silicone-based surface active agent and a process for the production thereof.

The foregoing object of the invention will become apparent from the following detailed description and examples.

The object of the invention is accomplished by the following aspects of the invention.

(1) A wiping material made of a polyurethane foam for a vacuum chamber for use in the preparation of a silicon wafer, wherein the polyurethane foam is free of silicone and has an open-cell structure comprising cells the diameter of which are controlled to fall within the range of from 500 μm to 3,000 μm.

(2) A process for the production of a wiping material made of a polyurethane foam for a vacuum chamber for use in the preparation of a silicon wafer which comprises previously mixing at least a polyol and tolylene diisocyanate to prepare an isocyanate-terminated prepolymer, mixing the isocyanate-terminated prepolymer with a non-silicone-based surface active agent having an HLB value of from 9 to 20, various additives and water, and then allowing the mixture to undergo reaction and foaming in a manner controlled such that the resulting wiping material has cells with a diameter of from 500 μm to 3,000 μm and is free of silicone.

(3) A process for the production of a wiping material made of a polyurethane foam for a vacuum chamber for use in the preparation of a silicon wafer which comprises mixing at least a polyol, tolylene diisocyanate, a non-silicone-based surface active agent, various additives and water, and then allowing the mixture to undergo reaction and foaming in a manner controlled such that the resulting wiping material has cells with a diameter of from 500 μm to 3,000 μm and is free of silicone.

BRIEF DESCRIPTION OF THE DRAWINGS

By way of example and to make the description more clear, reference is made to the accompanying drawings in which:

FIGS. 4A and 4B are schematic diagrams illustrating a production machine for use in the production process of FIG. 3, wherein FIG. 4A is a front view illustrating how a mixture which has been injected onto a conveyor undergoes foaming to form a polyurethane foam and FIG. 4B is a sectional view taken on line X—X of FIG. 4A.

DETAILED DESCRIPTION OF THE INVENTION

The present invention will be further described hereinafter with reference to preferred embodiments of the wiping material for a vacuum chamber according to the invention and the process for the production thereof in connection with the attached drawings. The inventor found that a wiping material which can efficiently wipe a sludge produced by deposition of ionized metal off the inner wall of a vacuum chamber without contaminating it with impurities or the like can be obtained by forming from a polyurethane foam wherein a non-silicone-based surface active agent is used as a foam stabilizer so that the resulting product is free of silicone and the diameter of cells is controlled to fall within a specific range. The inventor also found a process for the production of such a wiping material. The inventor further confirmed that the use of a so-called water base polyurethane having a good affinity for water for the purpose of improving water retention allows more effective wiping.

Figure 1:
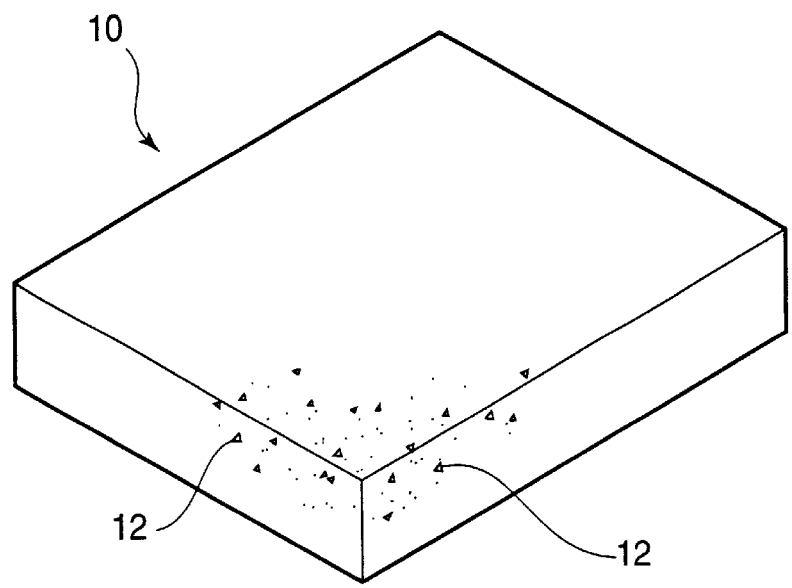
FIG. 1 is a schematic perspective view illustrating a preferred embodiment of the wiping material for a vacuum chamber according to the invention.
Figure 2:
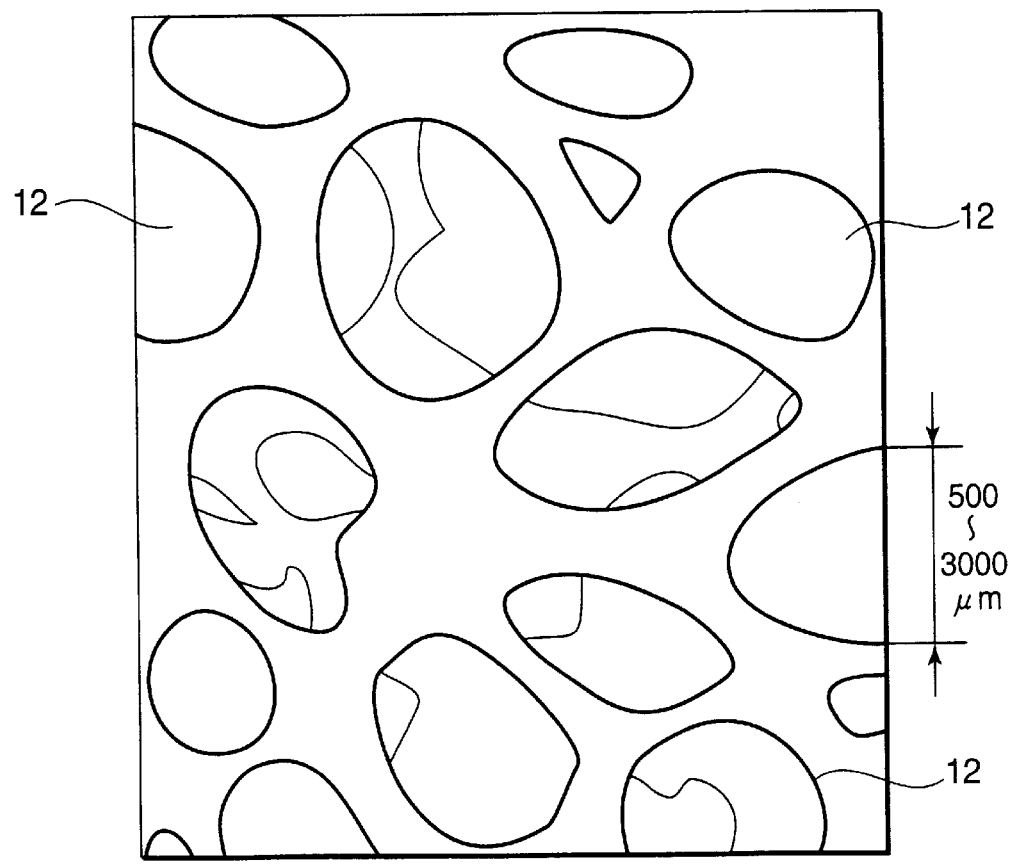
FIG. 2 is an enlarged schematic view of the surface of the wiping material of FIG. 1.

As shown in FIGS. 1 and 2, a wiping material 10 according to a preferred embodiment of implication of the present invention comprises as a substrate a spongy polyurethane foam having cells 12 which are communicating to each other and has a thickness required to improve its handleability during wiping. The shape of the foregoing wiping material 10 is not specifically limited. The wiping material 10 may be properly shaped according to the position to which it is applied.

The cells 12 are preferably three-dimensionally open to each other so that the wiping material 10 can easily retain water content therein and wipe off and retain sludges (see FIG. 2). The size (diameter) of the cells 12 preferably ranges from about 500 $\mu$m to about 3,000 $\mu$m, more preferably from about 1,000 $\mu$m to about 2,000 $\mu$m, and still more preferably from about 1,000 $\mu$m to about 1,500 $\mu$m. When the diameter of the cells is too small, the cells are clogged as in the prior art nonwoven cloth, deteriorating the wiping properties of the wiping material. On the contrary, when the diameter of the cells is too great, the resulting wiping material exhibits deteriorated wiping properties.

Production Process

A process for the production of a polyurethane foam as the wiping material 10 according to the foregoing embodiment of the invention will be described below in connection with FIGS. 3, 4A and 4B.

As the foam constituting the foregoing wiping material 10 there may be used a polyurethane foam free of silicone-based surface active agent as a foam stabilizer. In other words, there is preferably used a foam of so-called water base polyurethane which is a hydrophilic urethane obtained by previously preparing an isocyanate-terminated prepolymer from a polyol and TDI (tolylene diisocyanate), mixing the prepolymer, a non-silicone-based surface active agent having an HLB value of from 9 to 20 as a foam stabilizer, various additives and water, and then allowing the mixture to undergo slab foaming that causes reaction and foaming.

As a substitute for silicone-based surface active agent which is a foam stabilizer there is preferably used a non-silicone-based surface active agent such as anionic, cationic or amphoteric surface active agent. The use of such a non-silicone-based surface active agent makes it possible to prepare a silicone-free polyurethane foam. Examples of the foregoing various additives include various chemicals required for polymerization such as polymerization catalyst, e.g., amine catalyst and tin catalyst.

The polyurethane foam of a water base polyurethane having a high hydrophilicity which has previously been briefly described differs from other polyurethane foams in production process and thus the production process thereof will be described hereinafter separately in connection with FIG. 3.

Production of Wiping Material from Polyurethane Foam of Water Base Polyurethane

Figure 3:
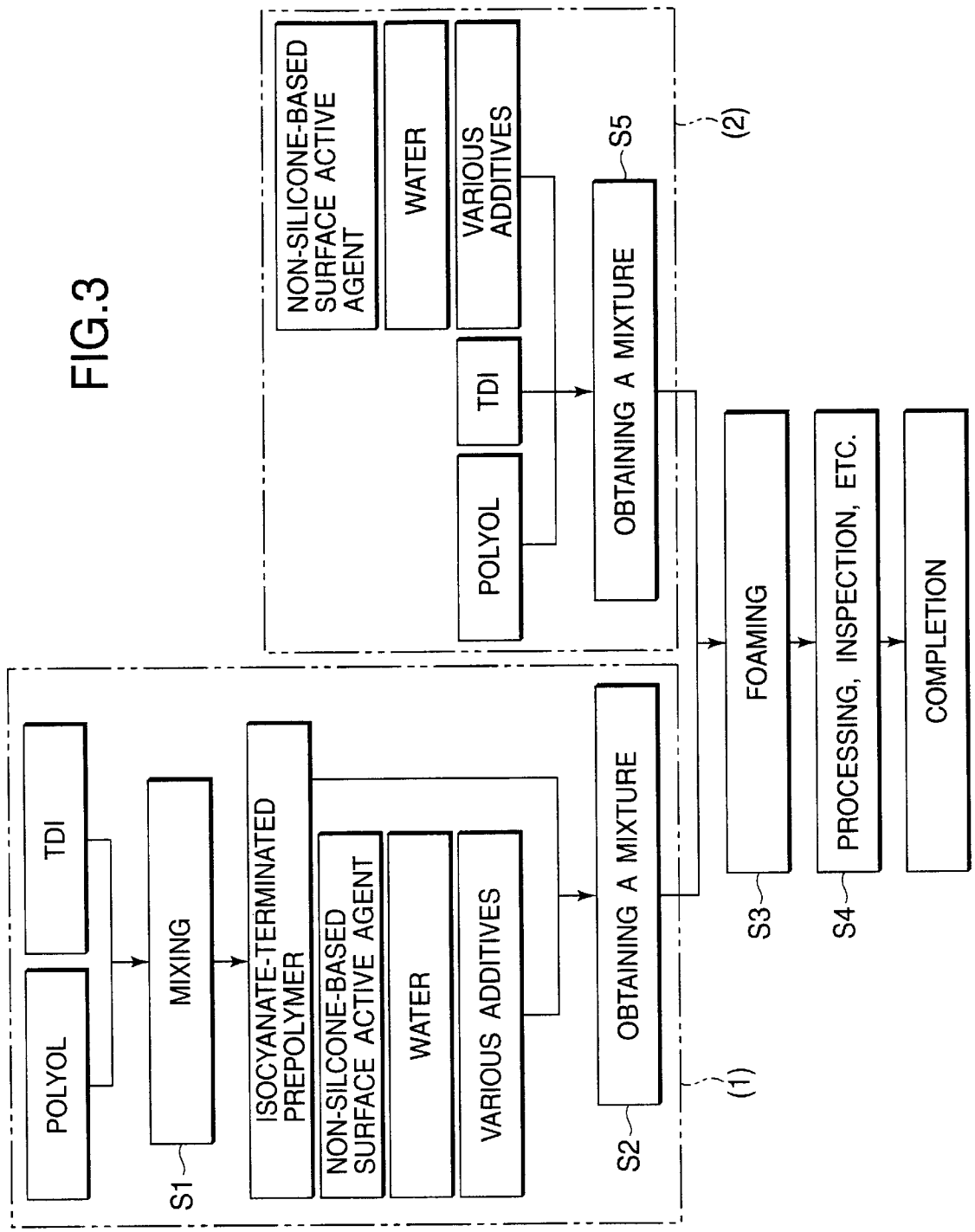
FIG. 3 is a flow chart illustrating the process for the production of a wiping material for a vacuum chamber.

This production process essentially comprises a prepolymer production step S1, a mixing step S2, a foaming step S3, and a final step S4 (see Frame (1) of FIG. 3).

The foregoing prepolymer production step S1 comprises previously mixing a polyol and TDI to prepare an isocyanate-terminated prepolymer to cause reaction with water and hence foaming in the mixing step S2 described later. By way of example, the isocyanate-terminated prepolymer was produced from 2 mols of a polyethylene glycol (molecular weight: 1,000), 1 mol of trimethylol propane, and 7.7 mols of a mixture of 2,4-tolylene diisocyanate and 2,6-tolylene diisocyanate (TDI) (mixing ratio: 80/20). The thus obtained isocyanate-terminated prepolymer has light yellow color, specific gravity of 1.10, a viscosity at 25° C. of 18,000 cps (Brookfield viscometer, rotor 4), and an NCO group content of 11 wt %.

The foregoing mixing step S2 comprises mixing 100 parts by weight of the isocyanate-terminated prepolymer obtained at the prepolymer production step S1 with 100 parts by weight of an aqueous solution containing 1 wt % of a non-silicone-based surface active agent (PLURONIC P-75, a trademark of a condensation product of propylene glycol and ethylene oxide, a product of BASF AG, an HLB value: 10) to obtain a mixture which is ready for reaction and foaming.

The foregoing foaming step S3 comprises allowing the mixture obtained at the mixing step S2 to undergo slab foaming or the like that causes reaction and foaming to obtain a polyurethane foam having a desired shape. In accordance with this production process, water acts as a polymerization initiator to prepare a hydrophilic polyurethane foam. Such a water base polyurethane allows penetration of water content not only in the cells 12 but also in the structure of the polyurethane and thus has a high water retention.

Figure 4A:
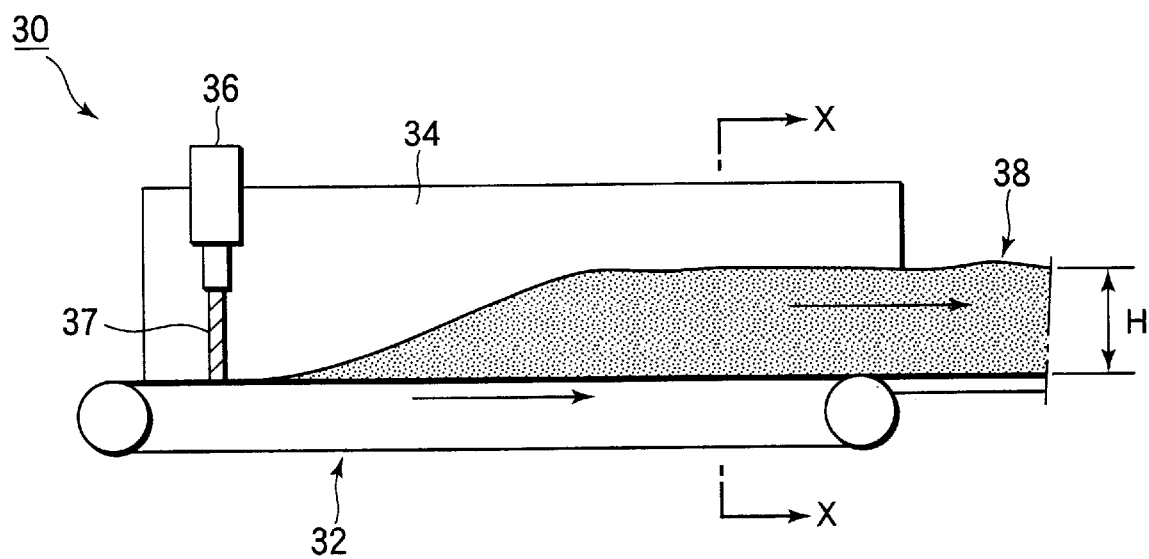
Figure 4B:
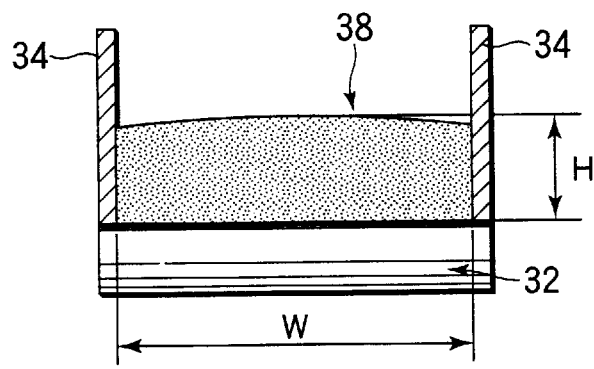

A production machine 30 utilizing slab foaming to be used at the foaming step S3 comprises side walls 34, 34 provided along the conveyance direction of a conveyor 32 at both sides of the upper surface thereof at a required gap (e.g., 2 m) as shown in FIGS. 4A and 4B. In operation, the foregoing mixture 37 is continuously injected through a starting material injection head 36 onto the upper surface of the conveyance 32 which is moving at a predetermined speed to continuously prepare a polyurethane foam 38. In accordance with this production process, a space formed by three surfaces, i.e., lower surface and two side surfaces is defined by the foregoing conveyor 32 and the right and left side walls 34, 34. This space is not defined on the upper surface thereof. In this space, the mixture is allowed to undergo continuous spontaneous foaming. For example, the foregoing polyurethane foam is formed into a size of 2 mm wide, 1 m high and 10 m long. This foam is cut and processed into shape with a proper dimensions at the final step S4 described later to obtain a wiping material 10 having a desired shape.

The polyurethane foam thus obtained is finally passed through the final step S4 involving cleaning, working into merchandise and inspection to obtain a completed product.

The content of the isocyanate group in the foregoing isocyanate-terminated prepolymer is preferably from 3 to 26% by weight based on the weight of the prepolymer. The content of the isocyanate group has an effect on the viscosity of the prepolymer. When the content of the isocyanate group is too small, the resulting prepolymer exhibits too high a viscosity. On the contrary, when the content of the isocyanate group is too great, the resulting prepolymer can hardly retain its desired shape during foaming. Thus, in either case, it is made difficult to obtain a desirable foam. The definition of the isocyanate content can apply to the following "production of a wiping material from a polyurethane foam of other urethanes".

Production of Wiping Material from Another Polyurethane Foaming Method

This production process essentially comprises a mixing step S5, a foaming step S3 and a final step S4 (see Frame (2) of FIG. 3). Among these steps, the foaming step S3 and final step S4 are the same as those in the foregoing "production of wiping material from polyurethane foam of water base polyurethane" and will be not described.

The foregoing mixing step S5 comprises mixing a polyol, TDI, a non-silicone-based surface active agent, water and various additives to obtain a mixture which is ready for reaction and foaming. The polyurethane foam prepared according to this process can retain water content only in the cells 12 and thus exhibits a low water retention as compared with the foregoing water base polyurethane. The polyurethane foam thus prepared is then passed through the foaming step S3 and final step S4 to complete a wiping material 10 having a desired shape.

The diameter of cells in the foregoing polyurethane foam is determined by physical properties such as an added amount and an HLB value of the non-silicone-based surface active agent as a foam stabilizer and the molar ratio of water and isocyanate group to be used in the reaction. By way of example, a water base polyurethane obtained by adding 1 part by weight of a non-silicone-based surface active agent having an HLB value of 10 to 100 parts by weight of an isocyanate-terminated prepolymer wherein the ratio of water to isocyanate group is 21.2:1 provides a polyurethane foam having a cell diameter of 1,200 $\mu$m and 24 cells per 25 mm. A water base polyurethane obtained by adding 1 part by weight of a non-silicone-based surface active agent having an HLB value of 4 to 100 parts by weight of an isocyanate-terminated prepolymer wherein the ratio of water to isocyanate group is 22.3:1 provides a polyurethane foam having a cell diameter of 500 $\mu$m and 44 cells per 25 mm.

The most important index among the foregoing conditions is HLB value. HLB value indicates the balance of hydrophilicity and hydrophobicity of surface active agent. The non-silicone-based surface active agent to be used herein exhibits an HLB value of from 0 to 20. The closer to 0 the HLB value is, the higher is the hydrophobicity of the non-silicone-based surface active agent. On the contrary, the closer to 20 the HLB value is, the higher is the hydrophilicity of the non-silicone-based surface active agent. A knowledge was obtained that the higher the hydrophilicity of the non-silicone-based surface active agent is, i.e., the greater the HLB value is, the greater is the size of the cells 12. By properly predetermining the HLB value of the non-silicone-based surface active agent, the diameter of the cells can be controlled to a desired value.

While the foregoing production process comprises preparing a polyurethane foam using a production machine 30 utilizing slab foaming, and then subjecting the polyurethane foam to desired cutting and processing to obtain a wiping material, a production process using a mold may be used depending on conditions such as rate of bubbling by reaction and foaming of mixture and size of cavity used or if the foam can be subjected to post-working such as removal of skin. In this case, a wiping material having a complicated shape can be easily prepared.

EXPERIMENT EXAMPLES

Examples of experiment on the wiping properties of wiping materials for vacuum chamber will be described hereinafter.

Test Specimens Used:

Test specimen A: Hydrophilic polyurethane foam (trade name: Lendell Foam NS-8000; produced by INOAC CORPORATION)

Test specimen B: Hydrophilic polyurethane foam (trade name: Lendell Foam MI-5000; produced by INOAC CORPORATION)

Test specimen C: Nonwoven cellulose cloth (trade name: Bemcot; produced by Asahi Kasei Kabushiki Kaisha)

Test specimen D: Urethane foam (trade name: Ultrasolve; produced by Wilshire Inc.)

Test specimen E: Hydrophobic polyurethane foam (trade name: MF-8; produced by INOAC CORPORATION)

Test specimen F: Hydrophobic polyurethane foam (trade name: CFH-20; produced by INOAC CORPORATION)

The foregoing 6 test specimens were each worked into a specimen having a size of 10 mm×60 mm×120 mm which was then subjected to experiment. For the nonwoven cellulose cloth as test specimen C, 24 sheets were laminated to a thickness of about 10 mm.

Experiment Method:

Using each of the foregoing test specimens, sludge on a glass plate was wiped out under a predetermined pressure. The change of weight of sludge from before wiping to after wiping was then measured to evaluate percent wiping. This experiment was conducted in dry and wet manners. In the dry experiment, the test specimens were each used as it was. In the wet experiment, the test specimens were each impregnated with purified water, and then squeezed to remove extra water before experiment.

Figure 5A:
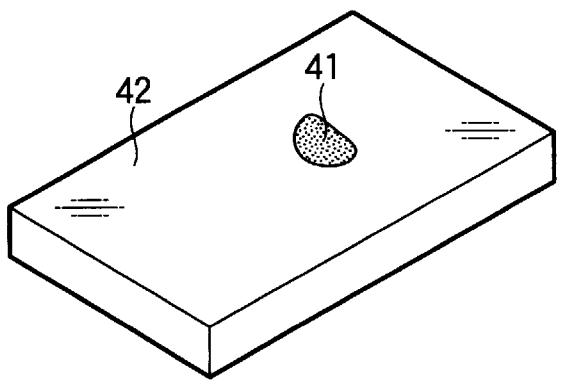
FIGS. 5A, 5B, 5C and 5D are diagrams illustrating stepwise an example of an experimental method.
Figure 5C:
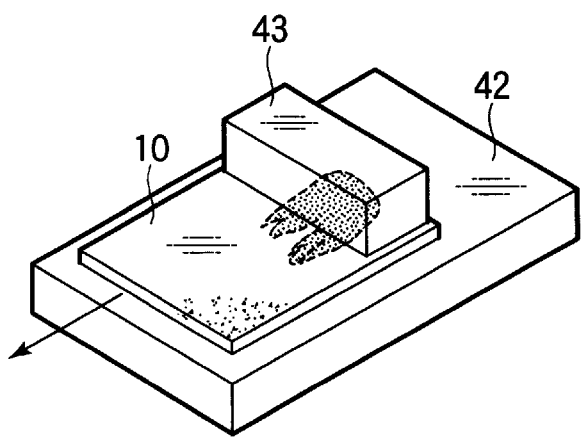
Figure 5B:
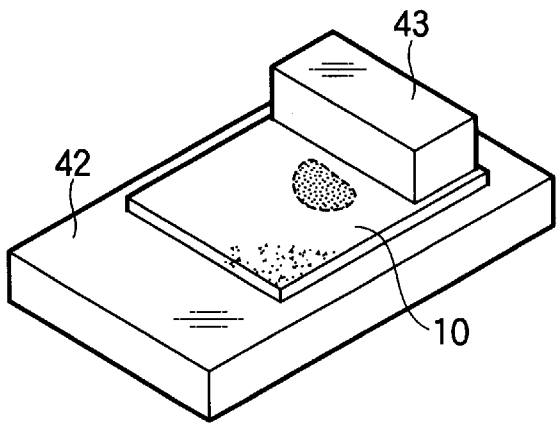
Figure 5D:
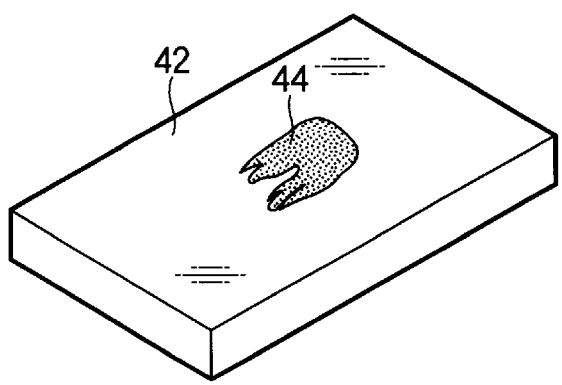

Experimental Procedure:

As sludge source there was used a test dust (Kanto loam dust: fine particle, average particle diameter: 6.7 $\mu$m) defined in JIS-Z-8901-1995. 70 parts by weight of the test dust were put in 100 parts by weight of distilled water to prepare a test sample 41. As shown in FIG. 5A, 1.5 g of the test sample was then dropped onto a glass plate 42. Subsequently, the various test specimens 10 were each put covering the test sample. Instead of the force to be applied during wiping, a weight (aluminum block having a weight of 292 g) 43 was put on the test specimen (see FIG. 5B). Under these conditions, the test specimen was pulled forward as viewed in the figure to wipe out the test sample (see FIG. 5C). The test sample which had been left unwiped 44 was collected, and then measured for weight (see FIG. 5D).

Experimental Results:

Tables 1 and 2 below indicate physical properties such as diameter of cells in the various test specimens and the percent wiping of these test specimens under wet and dry conditions.

TABLE 1

(wet)

| | Cell diameter ($\mu$m) | Residual amount (g) of sample after wiping | % Wiping |
|---|---|---|---|
| Test specimen A | 1,200 | 0.28 | 81.3 |
| Test specimen B | 500 | 0.72 | 52.0 |
| Test specimen C | 1,500 (longitudinal) 500 (crosswise) | 1.32 | 12.0 |
| Test specimen D | 250 | 1.10 | 26.7 |
| Test specimen E | 3,000 | 0.85 | 43.5 |
| Test specimen F | 1,200 | 0.55 | 63.5 |

TABLE 2

(dry)

| | Cell diameter ($\mu$m) | Residual amount (g) of sample after wiping | % Wiping |
|---|---|---|---|
| Test specimen A | 1,200 | 0.53 | 64.7 |
| Test specimen B | 500 | — | — |
| Test specimen C | 1,500 (longitudinal) 500 (crosswise) | 1.23 | 18.0 |
| Test specimen D | 250 | — | — |
| Test specimen E | 3,000 | 0.95 | 36.7 |
| Test specimen F | 1,200 | 0.65 | 56.7 |

Results:

As can be seen in Table 1, the test specimens A and B as polyurethane foam according to the invention exhibit a far better percent wiping than the test specimen C as nonwoven cloth, which has heretofore been used, and the test specimen D as an unprocessed foam. The comparison of the test specimens A and B having different cell diameters shows that the test specimen A, which has a cell diameter as great as 1,200 $\mu$m, exhibits better results than the other. The comparison of the test specimens A and F having the same cell diameter but different hydrophilicities/hydrophobicities shows that the test specimen A, which has a higher hydrophilicity than the other, exhibits a higher percent wiping than the other.

Referring to the difference in percent wiping due to difference in cell diameter, the comparison of the test specimens A, B and C to F shows that there may be an optimum point in the range of from 1,000 $\mu$m to 1,500 $\mu$m.

It was confirmed that when the cell diameter is not higher than 500 $\mu$m or not lower than 3,000 $\mu$m, the percent wiping is lowered.

As shown in the results of Tables 1 and 2, a foam can wipe at a higher efficiency when properly impregnated with water content than in dry form. This demonstrates that a polyurethane foam prepared from the foregoing hydrophilic water base polyurethane exhibits a higher percent wiping than a hydrophobic polyurethane foam.

As mentioned above, in accordance with the wiping material for vacuum chamber according to the invention and the process for the production thereof, a silicone-free polyurethane foam having a cell diameter, shape and size giving good wiping properties can be prepared. The wiping material thus obtained can be easily washed for re-use to reduce the cost required for wiping as well as save resources. When the wiping material of the invention is prepared from a polyurethane foam made of a water base polyurethane having a high hydrophilicity, wiping can be conducted at a higher efficiency.

While the invention has been described in detail and with reference to specific embodiments thereof, it will be apparent to one skilled in the art that various changes and modifications can be made therein without departing from the spirit and scope thereof.

This application is based on Japanese patent application No. 2000-199972 filed on Jun. 30, 2000, the entire contents thereof being hereby incorporated by reference.

What is claimed is:

1. A process for the production of a wiping material made of a polyurethane foam for a vacuum chamber for use in the preparation of a silicon wafer which comprises previously mixing at least a polyol and tolylene diisocyanate to prepare an isocyanate-terminated prepolymer, mixing said isocyanate-terminated prepolymer with a non-silicone-based surface active agent having an HLB value of from 9 to 20, and then allowing said mixture to undergo reaction and foaming in a manner controlled such that the resulting wiping material has cells with a diameter of from 500 $\mu$m to 3,000 $\mu$m and is free of silicone.

2. A process for the production of a wiping material made of a polyurethane foam for a vacuum chamber for use in the preparation of a silicon wafer which comprises mixing at least a polyol, tolylene diisocyanate, a non-silicone-based surface active agent, and then allowing said mixture to undergo reaction and foaming in a manner controlled such that the resulting wiping material has cells with a diameter of from 500 $\mu$m to 3,000 $\mu$m and is free of silicone.

3. The process for the production of a wiping material for vacuum chamber according to claim 2, wherein said non-silicone-based surface active agent has an HLB value of from 9 to 20.

* * * * *